US012221939B2

(12) United States Patent
Bogdanski

(10) Patent No.: US 12,221,939 B2
(45) Date of Patent: Feb. 11, 2025

(54) DEVICE FOR ROTATABLE MOUNTING OF A CAMSHAFT

(71) Applicant: MAN Truck & Bus AG, Munich (DE)

(72) Inventor: Peter Bogdanski, Schwabach (DE)

(73) Assignee: MAN Truck &Bus AG, Munich (DE)

( * ) Notice: Subject to any disclaimer, the term of this patent is extended or adjusted under 35 U.S.C. 154(b) by 775 days.

(21) Appl. No.: 16/104,392

(22) Filed: Aug. 17, 2018

(65) Prior Publication Data

US 2019/0055897 A1 Feb. 21, 2019

(30) Foreign Application Priority Data

Aug. 18, 2017 (DE) ........................ 102017118862.2

(51) Int. Cl.

| | |
|---|---|
| ***F02F 7/00*** | (2006.01) |
| ***F01L 1/047*** | (2006.01) |
| ***F01L 1/053*** | (2006.01) |
| ***F01L 1/18*** | (2006.01) |
| ***F02F 1/24*** | (2006.01) |

(52) U.S. Cl.

CPC ............. *F02F 7/006* (2013.01); *F01L 1/047* (2013.01); *F01L 1/053* (2013.01); *F02F 1/24* (2013.01); *F01L 2001/0476* (2013.01); *F01L 1/181* (2013.01); *F02F 2007/0063* (2013.01)

(58) Field of Classification Search

CPC . F01L 1/047; F01L 1/053; F01L 1/181; F01L 2001/0476; F02F 1/24; F02F 2007/0063; F02F 7/006

See application file for complete search history.

(56) References Cited

U.S. PATENT DOCUMENTS 4,527,518 A 7/1985 Osaki et al.
4,537,166 A * 8/1985 Kimura .................. F01L 1/053 123/90.34
4,823,747 A * 4/1989 Wagner ................ F01L 1/0532 123/193.5
5,522,354 A 6/1996 Sakamoto et al.
(Continued)

FOREIGN PATENT DOCUMENTS

CN 1495342 A 5/2004
CN 101196128 A 6/2008
(Continued)

OTHER PUBLICATIONS

Notification of the First Office Action issued in Chinese Application No. 201810946867.4 dated Aug. 18, 2021 with English translation, 12 pages.

(Continued)

*Primary Examiner* — Grant Moubry
*Assistant Examiner* — Ruben Picon-Feliciano
(74) *Attorney, Agent, or Firm* — Weber Rosselli & Cannon LLP

(57) ABSTRACT

A device for rotatable mounting of a camshaft of an internal combustion engine. The device includes a first bearing body with a receiver for rotatable mounting of the camshaft. The device has a cylinder head or a fixing frame for fixing the first bearing body. The device has a first fixing means which fixes the first bearing body to the cylinder head or fixing frame. The first fixing means is the sole fixing means which fixes the first bearing body to the cylinder head or fixing frame.

23 Claims, 2 Drawing Sheets

(56) References Cited

U.S. PATENT DOCUMENTS

| | | | | |
|---|---|---|---|---|
| 5,562,072 | A | 10/1996 | Stoody, Jr. | |
| 2001/0035142 | A1* | 11/2001 | Ebesu | F02F 1/38 123/90.15 |
| 2007/0125330 | A1* | 6/2007 | Lee | F01L 1/267 123/90.27 |
| 2008/0149064 | A1 | 6/2008 | Shibata et al. | |
| 2008/0295796 | A1* | 12/2008 | Dunsch | F01L 1/053 123/195 C |
| 2011/0041790 | A1* | 2/2011 | Ilgeroth | F01L 1/053 123/90.27 |
| 2012/0073533 | A1* | 3/2012 | Hamada | F01L 1/053 74/567 |
| 2013/0055981 | A1* | 3/2013 | Flender | F01L 1/047 123/90.27 |
| 2017/0002766 | A1* | 1/2017 | Demeulenaere | F16C 35/12 |

FOREIGN PATENT DOCUMENTS

| | | | |
|---|---|---|---|
| CN | 201546769 | U | 8/2010 |
| CN | 102061952 | A | 5/2011 |
| CN | 102536497 | A | 7/2012 |
| CN | 104481621 | A | 4/2015 |
| CN | 105874175 | A | 8/2016 |
| DE | 3424773 | A1 | 1/1985 |
| DE | 3541700 | A1 | 5/1987 |
| DE | 3912495 | A1 | 10/1990 |
| DE | 4434840 | A1 | 4/1995 |
| DE | 19752381 | A1 | 5/1999 |
| DE | 102007025129 | A1 | 12/2008 |
| DE | 102010019129 | A1 | 11/2011 |
| DE | 102011081483 | A1 | 2/2013 |
| EP | 0285598 | B1 | 10/1990 |
| EP | 1936130 | A2 | 6/2008 |
| EP | 3078820 | A1 | 10/2016 |
| GB | 2130672 | A | 6/1984 |
| JP | S5958109 | A | 4/1984 |
| JP | 60008450 | A | 1/1985 |
| JP | S63143309 | A | 6/1988 |
| JP | H1018826 | A | 1/1998 |
| JP | 2001329907 | A | 11/2001 |
| JP | 4036401 | B2 | 1/2008 |
| JP | 2008157061 | A | 7/2008 |
| JP | 2011241700 | A | 12/2011 |
| RU | 2393360 | C2 | 6/2010 |
| WO | 2008061382 | A1 | 5/2008 |
| WO | 2009095215 | A1 | 8/2009 |
| WO | 2010086517 | A1 | 8/2010 |
| WO | 2012055150 | A1 | 5/2012 |

OTHER PUBLICATIONS

Russian Office Action issued in Russian Application No. 2018129776/12(048120) dated Dec. 27, 2021, with English translation, 10 pages.

Notification of Reason for Rejection issued in Japanese Application No. 2018-153795 dated Sep. 20, 2022 with English translation.

Communication under Rule 71(3) EPC issued in European Patent Application No. 21157914.9 dated Nov. 14, 2023 with English translation through google translate.

Notice of First Examination Opinion issued in Chinese Patent Application No. 202210391888.0 dated Mar. 13, 2024 with English translation.

* cited by examiner

DEVICE FOR ROTATABLE MOUNTING OF A CAMSHAFT

BACKGROUND

The present disclosure concerns a device for rotatable mounting of a camshaft.

Camshafts are used in internal combustion engines to control the inlet and exhaust valves, and are attached via so-called bearing blocks for example to a cylinder head in the cylinder crankcase of the internal combustion engine. Alternatively, the bearing blocks may also be attached to a fixing frame. The bearing blocks mount the camshaft rotatably. In order to ensure that the camshafts are mounted so as to run as freely as possible, it is necessary for the camshaft and bearing blocks to be aligned relative to the cylinder head.

DE 10 2011 081 483 A1 discloses a method for simplified and positionally precise fixing of a camshaft module with a camshaft and bearing blocks on a cylinder head. The bearing blocks are fixed to the camshaft oriented in the axial direction and with respect to an angle. The camshaft is oriented relative to the cylinder head via two alignment elements. The individual bearing blocks are bolted to the cylinder head with simultaneous or intermediate rotation of the camshaft.

DE 197 52 381 A1 discloses a cylinder head for an internal combustion engine. At least one bearing block is provided on the cylinder head, with one bearing half for a camshaft and one bearing half for a rocker arm shaft for at least one rocker arm. A first separate lubricant supply channel is provided in the cylinder head and a second separate lubricant supply channel in the bearing block. A first end of the second lubricant supply channel is connected to the first lubricant supply channel. A second end of the second lubricant supply channel terminates openly in a bearing face for the rocker arm shaft.

WO 2008/061382 A1 discloses a camshaft assembly. The camshaft assembly comprises at least two bearing blocks each with the bearing receiver in which a shaft portion of a camshaft is rotatably arranged. A flat contact face is provided on each bearing block for support and fixing of the bearing block to a contact face of a cylinder head. Each bearing block is attached to the cylinder head by two bolts.

EP 0 285 598 B1 discloses an injection internal combustion engine with cylinders arranged in line, with two overhead camshafts, and four valves and one central pump nozzle per cylinder. Releasably attached rocker arms for driving the pump nozzles are provided above the assigned camshaft on the cylinder head. The cam for the rocker arm for actuating the pump nozzles is driven alternately for one cylinder by the one camshaft and for the adjacent cylinder by the second camshaft, wherein each rocker arm is attached individually. The rocker arms are releasably attached individually to the bearing blocks which are fixed by bolts to the cylinder head, wherein the bolts simultaneously serve for anchoring bearing parts for the camshaft.

DE 10 2007 025 129 A1 discloses a cylinder head cover for covering a cylinder crankcase of an internal combustion engine. At least one bearing upper part for a camshaft comprises at least one passage opening which aligns on one side with a threaded or passage opening in a bearing lower part and/or a threaded opening in the cylinder crankcase, and on the other side with a passage opening in the cylinder head cover. The cylinder head cover and bearing upper part on the cylinder crankcase may be attached via a common fixing screw.

SUMMARY

The present disclosure is based on the object of providing an alternative or improved device for rotatable mounting of a camshaft. In particular, a simple construction is provided which is optimised with regard to installation space.

A device is provided for rotatable mounting of a camshaft of an internal combustion engine. The device comprises a first bearing body with a receiver for rotatable mounting of the camshaft. The device has a cylinder head or a fixing frame for fixing the first bearing body. The device has a first fixing means (for example a first fixing bolt) which fixes the first bearing body to the cylinder head or fixing frame. The first fixing means is the sole fixing means which fixes (attaches, secures) the first bearing body to the cylinder head or fixing frame.

The device offers the advantage that the first bearing body may be designed more compactly. The first bearing body need only provide enough material for receiving the fixing means on one side next to the camshaft receiver. In particular, the first bearing body may be formed asymmetrically relative to a vertical plane through a central longitudinal axis of the receiver. In addition, production costs may be reduced since fewer fixing means are required, fewer receivers must be produced for fixing means (e.g. screw holes), and the installation time is reduced. Depending on design, the first bearing body may be fixed either to a cylinder head or to a fixing frame.

Since only one receiver (e.g. blind hole or similar) need be provided for the sole fixing means, the cylinder head or fixing frame may also be designed more freely.

In particular, the first bearing body may comprise a first side region in which the first fixing means is received, and a second side region opposite the first side region relative to the receiver for the camshaft. The cylinder head may comprise a flow channel which extends into a region of the cylinder head which is arranged next to (e.g. adjacent to) the second side region (e.g. below the second side region relative to a vertical axis) of the first bearing body. The flow channel may preferably have a form (design) free from casting protrusions in this region. This is achieved if no casting extension (casting protrusion) is required to receive a blind hole for a further fixing means. Thus the provision of just a single fixing means may contribute to a fluid-dynamically optimised design of the flow channel in the cylinder head.

The receiver for the camshaft may be a cylindrical passage hole or a depression in the form of a half cylinder.

Further, when a fixing frame is used for fixing the first bearing body, the fixing frame may be fixed (attached, secured) to a cylinder head.

It is also possible that the camshaft is arranged as an overhead camshaft. For example, when a rocker arm with cam follower is used to follow a cam contour of the camshaft, the camshaft is pressed down in operation. Thus the camshaft does not have a tendency to lift, whereby use of a single fixing means may be sufficient.

In one embodiment, the first fixing means is a fixing screw. In particular, the first fixing screw may be the sole fixing screw which fixes the first bearing body to the cylinder head or fixing frame.

The first bearing body may comprise a passage hole for receiving the first fixing means, in particular the first fixing screw which extends through the passage hole.

In a further embodiment, the first fixing means fixes the first bearing body to the cylinder head or fixing frame by force fit and form fit.

The first fixing means may be a releasable fixing means.

The first fixing means may be the sole (e.g. releasable) fixing means of the device.

In one embodiment variant, the first bearing body forms a one-piece bearing block for mounting the camshaft.

Alternatively, the device comprises a second bearing body with a receiver (e.g. as a depression in the form of a half cylinder) for mounting the camshaft. The first bearing body and the second bearing body together form a two-piece bearing block. The receiver (e.g. a depression in the form of a half cylinder) of the first bearing body and the receiver (e.g. a depression in the form of a half cylinder) of the second bearing body form a common receiver for the camshaft.

Thus the present disclosure may be used not only for one-piece bearing blocks but also for two-piece bearing blocks. Consequently, the present disclosure may be used not only with assembled camshafts but also with forged camshafts on which it is not possible to thread the bearing blocks into place.

Preferably, the second bearing body may comprise a passage hole for receiving the first fixing means, in particular the first fixing screw which extends through the passage hole. The passage hole of the first bearing body and the passage hole of the second bearing body may be oriented aligned to each other.

In a refinement, the first bearing body and the second bearing body are fixed together, preferably by force fit and form fit, via a second fixing means, in particular a second fixing screw.

The first fixing means and the second fixing means may be provided on opposite sides of the first bearing body relative to the receiver for the camshaft.

The second fixing means may be a releasable fixing means.

In an embodiment, the first fixing means and the second fixing means, in particular the first fixing screw and the second fixing screw, are the sole fixing means of the device.

In a further variant embodiment, the first fixing means also fixes the second bearing body to the cylinder head or fixing frame. It is also possible that the first fixing means is the sole fixing means which fixes the second bearing body to the first bearing body.

In an exemplary embodiment, the device furthermore comprises at least one positioning element which is arranged between the first bearing body and the second bearing body for positioning the first bearing body relative to the second bearing body. In this way, it can in particular be ensured that the camshaft receivers of the bearing bodies are aligned to each other. In particular, the positioning elements can position the first bearing body relative to the second bearing body in a plane perpendicular to the longitudinal axis of the first fixing means.

Alternatively, the device may comprise no positioning element for positioning the first or second bearing body relative to the cylinder head or fixing frame. In this way, the costs for the positioning elements may be saved.

In a further refinement, the at least one positioning element arranged between the first bearing body and the second bearing body comprises a positioning dowel, an adapter sleeve surrounding the first fixing means and/or an adapter sleeve surrounding the second fixing means. Here, in particular, the use of adapter sleeves allows the bearing bodies to be dimensioned small, since no additional material regions are required for the provision of bores for positioning dowels.

In one exemplary embodiment, the device furthermore comprises at least one positioning element which is arranged between the first or second bearing body and the cylinder head or fixing frame for positioning the first or second bearing body relative to the cylinder head or fixing frame. Thus an orientation of the corresponding bearing body relative to the cylinder head or fixing frame may be improved. In particular, the positioning elements may position the first or second bearing body relative to the cylinder head or fixing frame in a plane perpendicular to the longitudinal axis of the first fixing means.

In a refinement, the at least one positioning element arranged between the first or second bearing body and the cylinder head or fixing frame comprises a positioning dowel and/or an adapter sleeve which surrounds the first fixing means. The use of an adapter sleeve allows the bearing body to be dimensioned small, since no additional material regions are required for the provision of bores for positioning dowels.

It is however also possible not to provide a positioning element between the first or second bearing body and cylinder head or fixing frame. The corresponding bearing body and cylinder head (or fixing frame) may then be aligned by guidance by the camshaft. The camshaft is mounted in several devices for rotatable mounting of the camshaft, spaced apart in the longitudinal direction of the camshaft.

In a further exemplary embodiment, the device comprises a rocker arm shaft for rotatable mounting of a rocker arm. The first fixing means additionally fixes the rocker arm shaft to the cylinder head or fixing frame, and in particular also to the first and/or second bearing body. Thus no further fixing means is required for fixing the rocker arm shaft. Consequently, installation time may also be reduced.

In one embodiment, the first bearing body has a receiver for the rocker arm shaft which is arranged preferably on a side of the first bearing body opposite the cylinder head or fixing frame.

In a further embodiment, a longitudinal channel of the rocker arm shaft for lubricating fluid is fluidically connected to the receiver for the camshaft of the first bearing body, preferably via a branch channel of the first bearing body and a branch channel of the rocker arm shaft. Thus a lubricating fluid may flow via the rocker arm shaft to a plain bearing of the camshaft.

In an embodiment variant, the fixing frame or the cylinder head has a hole, in particular a blind hole or a passage hole, with a thread for force fit and form fit fixing of the first bearing body to the fixing frame or cylinder head by means of the first fixing means. The first fixing means, in particular in the form of a fixing screw, for fixing the first bearing body (and where applicable the second bearing body) may thus be screwed directly into the threaded hole.

In a further embodiment variant, the first bearing body is configured asymmetrically relative to a vertical plane through a central longitudinal axis of the receiver for the camshaft. This is made possible in particular by the provision of a single fixing means (the first fixing means) for fixing to the cylinder head or fixing frame.

Alternatively or additionally, the first fixing means may generate a tilting moment to support the first bearing body on a contact face of the cylinder head or fixing frame.

The present disclosure also concerns a motor vehicle, in particular a utility vehicle, with a device as disclosed herein. The utility vehicle may for example be a truck or a bus.

It is also possible to use the device as disclosed herein for cars, large engines, off-road vehicles, stationary engines, marine engines etc. The embodiments and features of the present disclosure described above may be combined with each other arbitrarily.

BRIEF DESCRIPTION OF THE DRAWINGS

Further details and advantages of the present disclosure are described below with reference to the enclosed drawings. The drawings show.

The embodiments shown in the figures correspond at least partially, so similar or identical parts carry the same reference signs and, for their explanation, reference is also made to the description of the other embodiments or figures, in order to avoid repetition.

DETAILED DESCRIPTION

Figure 1:
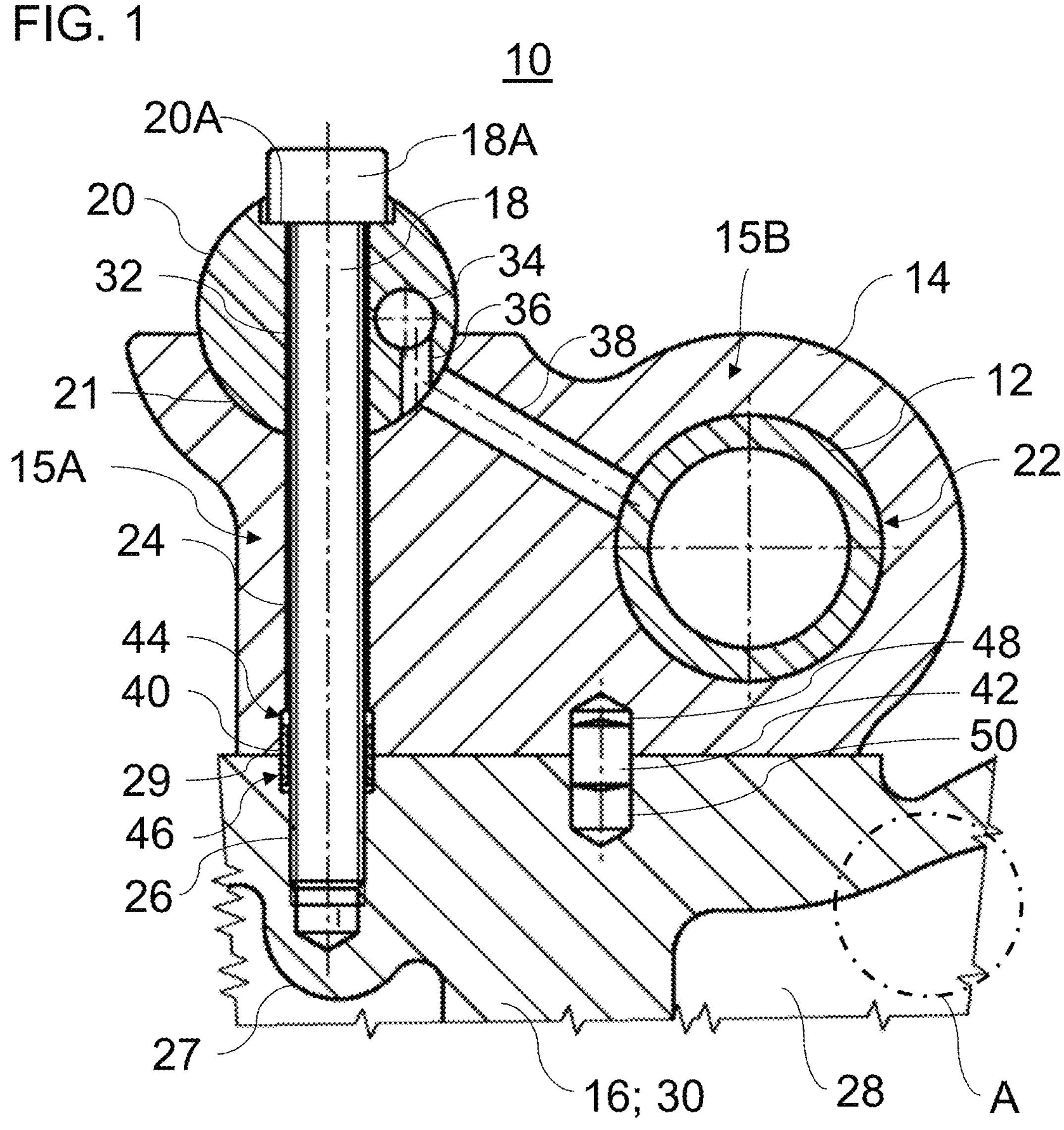
FIG. 1 a sectional view through a device for rotatable mounting of a camshaft.

FIG. 1 shows a device 10 for rotatable mounting of a camshaft 12. The device 10 comprises a bearing body 14, a cylinder head 16, a fixing screw 18 and a rocker arm shaft 20.

The device 10 may be used in any internal combustion engine for mounting the camshaft 12. The internal combustion engine may for example be contained in a motor vehicle, in particular a utility vehicle. The utility vehicle may for example be a truck or a bus.

The bearing body 14 is configured as a one-piece bearing block. The bearing body 14 has a receiver 22 for the camshaft 12. The camshaft 12 may be mounted rotatably in the receiver 22 via a plain bearing. The receiver 22 is a cylindrical passage bore of the bearing body 14. The camshaft 12 is an assembled camshaft. A cylindrical portion of the camshaft 12 is inserted in the receiver 22 when the camshaft 12 is in the disassembled state. The camshaft 12 is then assembled. For rotatable mounting of the camshaft 12, a plurality of bearing bodies 14 is provided along a longitudinal axis of the camshaft 12. The camshaft 12 is arranged as an overhead camshaft (OHC).

The bearing body 14 is attached (fixed) to the cylinder head 16 via the fixing screw 18. In detail, the fixing screw 18 passes through a passage hole 24 of the bearing body 14. The fixing screw 18 is screwed into a thread of a blind hole 26 of the cylinder head 16. The blind hole 26 extends into a casting extension (casting protrusion) 27 which is formed in particular for provision of the blind hole 26 or a passage hole.

It should be emphasised here that the fixing screw 18 is the sole fixing screw which fixes the bearing body 14 to the cylinder head 16. Conventional bearing blocks use at least two or four fixing screws for fixing the bearing body to the cylinder head.

It has been found that the fixing screw 18 is sufficient as the sole fixing screw for the bearing body 14. For example, in embodiments in which a rocker arm is used, the camshaft 12 is pressed down during operation by the cam follower of the rocker arm. The own weight of the camshaft 12 also acts downward. The camshaft 12 thus has no tendency to lift, together with the bearing body 14, from the cylinder head 16. Also, the screw force of the fixing screw 18 and a unilateral material region next to the fixing screw 18 (on the left in FIG. 1) generate a tilting moment on a contact face 29 of the cylinder head 16, which holds the first bearing body 14 securely on the cylinder head 16.

One advantage of using a single fixing screw 18 is the more compact dimensioning of the bearing body 14 and the saving of costs for further fixing screws. In detail, the bearing body 14, starting from the receiver 22, need have a material region for receiving the fixing screw 18 on just one side. On the opposite side, the bearing body 14 may terminate directly with a wall region adjacent to the receiver 22. Thus the bearing body 14 may be better adapted to the installation space available. In particular, the bearing body 14 may be configured asymmetrically relative to a vertical plane through a central longitudinal axis of the receiver 22 of the bearing body 14.

In addition, there is a greater degree of freedom with regard to the design of the cylinder head 16. The cylinder head 16 need have no casting extension (casting protrusion) in region A for provision of a blind hole for screwing in a fixing screw. Instead, region A may for example be formed fluid-dynamically optimised for a fluid channel 28 in the cylinder head 16.

Finally, the number of parts of the device may be reduced because of the reduction in fixing screws. Also, the production time and installation time are reduced since fewer screw holes need be made and fewer fixing screws fitted.

In addition, it is pointed out that the present disclosure is not restricted to the fixing screw 18 fixing the bearing body 14 to the cylinder head 16. Alternatively, the fixing screw 18 could fix the bearing body 14 to a fixing frame 30. The fixing frame 30 could then in turn be attached to a cylinder head. In other words, the component shown in FIG. 1 below the bearing body 14 could, instead of a region of the cylinder head 16, alternatively be a region of a fixing frame 30.

As an alternative to the fixing screw 18, another fixing means could be used for force-fit and form-fit fixing of the bearing body 14 to the cylinder head 16.

The rocker arm shaft 20 serves for rotatable mounting of a rocker arm (not shown). The rocker arm is actively connected via a cam follower between the camshaft 12 and one or more gas exchange valves (not shown) for actuation of the gas exchange valves.

In the embodiment depicted by FIG. 1, the fixing screw 18 also fixes the rocker arm shaft 22 the cylinder head 16 (fixing frame 30). In detail, the fixing screw 18 extends through a passage hole 32 of the rocker arm shaft 20. With the device 10 in mounted state, the holes 32, 24 and 26 are aligned with each other along a longitudinal axis of the fixing screw 18. A screw head 18A lies on a contact face 20A of the rocker arm shaft 20. The rocker arm shaft 20 is mounted in a receiver 21 of the bearing body 14. The additional fixing of the rocker arm shaft 20 via the fixing screw 18 is optional.

To lubricate the plain bearing in the receiver 22, a lubricating fluid may be supplied via a longitudinal channel 34 of the rocker arm shaft 20. A branch channel 36 of the rocker arm shaft 20 opens into a branch channel 38 of the bearing body 14. The branch channel 38 in turn opens into the receiver 22.

Optionally, also, positioning elements 40, 42 may be used for positioning the bearing body 14 relative to the cylinder head 16 (fixing frame 30). The positioning elements 40, 42 position the bearing body 14 relative to the cylinder head 16 in a plane perpendicular to the longitudinal axis of the fixing screw 18.

The positioning element 40 is configured as an adapter sleeve. The positioning element 40 is held by form fit in a recess 44 of the bearing body 14 and a recess 46 of the cylinder head 16 (fixing frame 30). The positioning element 40 is arranged around the fixing screw 18, preferably without touching the fixing screw 18.

The positioning element 42 is configured as a positioning dowel. The positioning element 42 is held by form fit in a recess 48 of the bearing body 14 and a recess 50 of the cylinder head 16 (fixing frame 30). The positioning elements may for example also be configured as adapter sleeves.

It is pointed out that embodiments without positioning element are also conceivable. The bearing body 14 may then be aligned for example by means of guidance by the camshaft 12 which is mounted in several bearing bodies 14.

Figure 2:
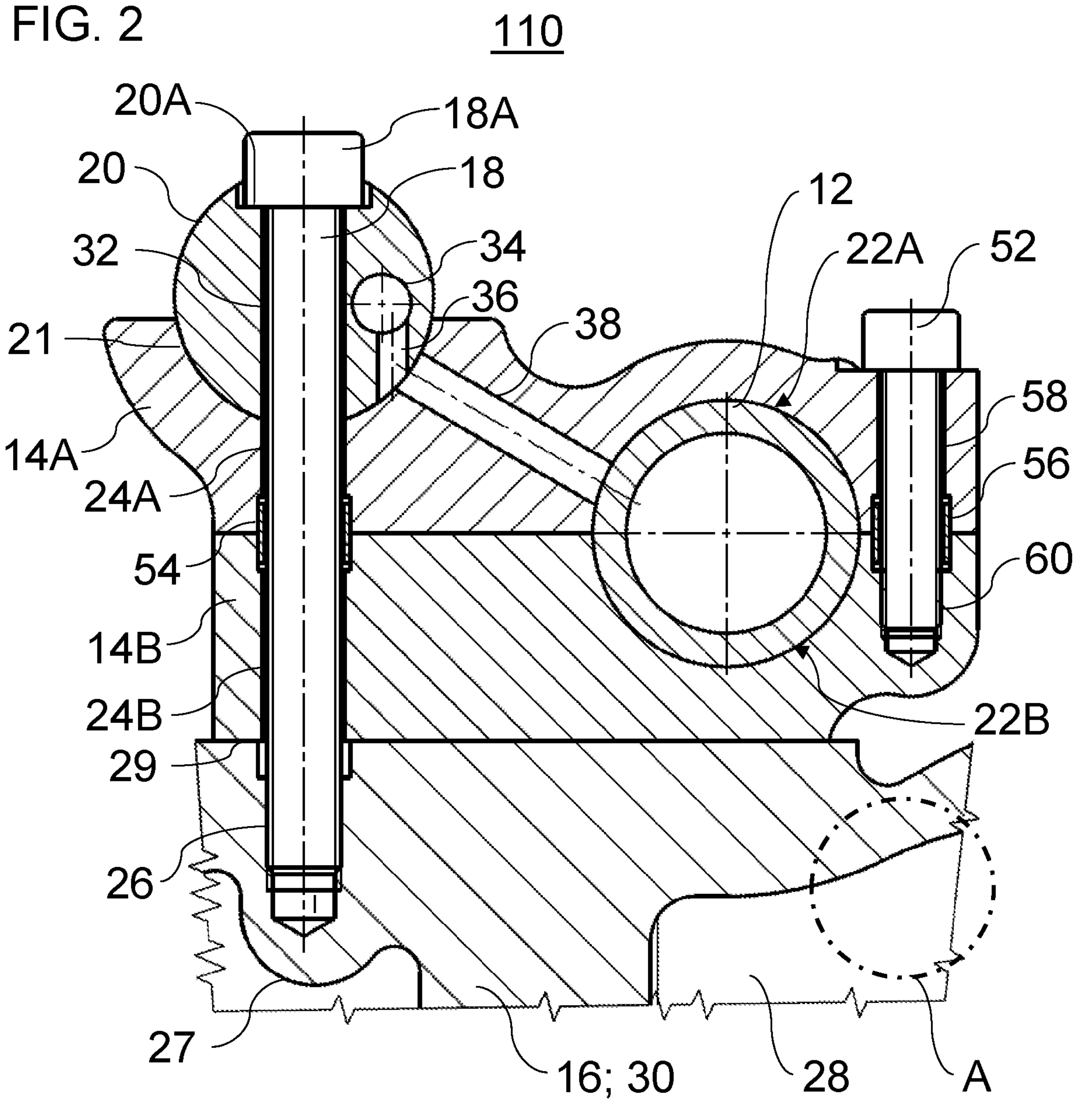
FIG. 2 a sectional view through a device for rotatable mounting of a camshaft according to a further exemplary embodiment.

FIG. 2 shows a further exemplary embodiment of a device 110 for rotatable mounting of the camshaft 12. The device 110 is distinguished in particular in that it is also suitable for rotatable mounting of forged camshafts, since it is not possible to thread the bearing blocks into place on these.

Instead of a one-piece bearing body, the device 110 comprises a first bearing body 14A and a second bearing body 14B. The first bearing body 14A and the second bearing body 14B form a two-piece bearing block. The first bearing body 14A has a first receiver 22A, and the second bearing body 14B has a second receiver 22B. The receivers 22A, 22B form a common receiver in cylindrical form for the camshaft 12.

In this embodiment, it should again be emphasised that the fixing screw 18 is the sole fixing screw which attaches (fixes) the bearing bodies 14A, 14B to the cylinder head 16 (fixing frame 30). In detail, the fixing screw 18 extends through a passage hole 24A of the first bearing body 14A and through a passage hole 24B of the second bearing body 14B.

In addition, a second fixing screw 52 may be provided which fixes the first bearing body 14A to the second bearing body 14B. The fixing screws 18 and 52 may be positioned on opposite sides of the camshaft 12. The fixing screw 52 extends through a passage hole 58 in the first bearing body 14A. The fixing screw 52 is screwed into a thread of a blind hole 60 of the second bearing body 14B.

Positioning elements 54 and 56 are provided for positioning the bearing bodies 14A and 14B relative to each other. The positioning elements 54, 56 position the first bearing body 14A relative to the second bearing body 14B in a plane perpendicular to the longitudinal axis of the fixing screw 18. The positioning elements 54, 56 are configured as adapter sleeves, but may however also be configured as dowels for example. The positioning elements 54, 56 connect the first bearing body 14A to the second bearing body 14B by form fit. The position element 54 is arranged around the fixing screw 18, preferably without touching the fixing screw 80. The positioning element 56 is arranged around the fixing screw 52, preferably without touching the fixing screw 52.

The device 110 of FIG. 2 is an exemplary embodiment in which no positioning elements are provided for positioning the first and second bearing bodies 14A, 14B relative to the cylinder head 16 (positioning frame 30). In refinements of this exemplary embodiment, positioning elements may be provided between the second bearing body 14B and the cylinder head 16 (fixing frame 30).

The present disclosure is not restricted to the exemplary embodiments described above. Rather, a plurality of variants and derivatives are possible which also make use of the concepts of the present disclosure and therefore fall within the scope of protection.

LIST OF REFERENCE SIGNS

10, 110 Device for rotatable mount of a camshaft
12 Camshaft
14 Bearing body
14A First bearing body
14B Second bearing body
15A First side region
15B Second side region
16 Cylinder head
18 Fixing screw (fixing means)
18A Screw head
20 Rocker arm shaft
20A Contact face
21 Receiver
22 Receiver
22A Receiver in first bearing body
22B Receiver in second bearing body
24 Passage hole
24A Passage hole in first bearing body
24B Passage hole in second bearing body
26 Blind hole
27 Casting extension (casting protrusion)
28 Fluid channel
29 Contact face
30 Fixing frame
32 Passage hole
34 Longitudinal channel
36 Branch channel
38 Branch channel
40 Adapter sleeve (positioning element)
42 Positioning dowel (positioning element)
44 Recess
46 Recess
48 Recess
50 Recess
52 Fixing screw
54 Adapter sleeve (positioning element)
56 Adapter sleeve (positioning element)
58 Passage hole
60 Blind hole
A Region free from casting extensions (casting protrusions)

I claim:

1. A device for rotable mounting of a camshaft of an internal combustion engine, comprising:

a first bearing body composed of a first side region and a second side region, wherein the first bearing body comprises a receiver for rotatable mounting of the camshaft arranged in the second side region;

a cylinder head or a fixing frame for fixing the first bearing body, wherein the first side region and the second side region are directly in contact with a contact face of the cylinder head or the fixing frame;

a first fixing means being the sole fixing means which fixes the first bearing body to the cylinder head or the fixing frame, wherein:

a) the first fixing means is partially arranged in the first side region and generates a tilting moment to support the first side region of the first bearing body on the contact face of the cylinder head or the fixing frame, and b) an own weight of the camshaft acts downward to support the second side region of the first bearing body on the contact face of the cylinder head or the fixing frame, and c) the second side region and the contact face contact each other in a region extending from the first fixing means only to a point directly below the receiver for mounting the camshaft.

2. The device according to claim 1, wherein:

the first fixing means is a fixing screw; or the first fixing means fixes the first bearing body to the cylinder head or the fixing frame by force fit and form fit; or the first fixing means is a releasable fixing means.

3. The device according to claim 1, wherein the first bearing body forms a one-piece bearing block for mounting the camshaft.

4. The device according to claim 1, further comprising a second bearing body with a receiver for mounting the camshaft, wherein:

the first bearing body and the second bearing body together form a two-piece bearing block; and the receiver of the first bearing body and the receiver of the second bearing body form a common receiver for the camshaft.

5. The device according to claim 4, wherein:

the first bearing body and the second bearing body are fixed together via a second fixing means.

6. The device according to claim 5, wherein the second fixing means is a second fixing screw.

7. The device according to claim 5, wherein:

the first bearing body and the second bearing body are fixed together by force fit and form fit; or the second fixing means is a second fixing screw.

8. The device according to claim 4, wherein:

the first fixing means also fixes the second bearing body to the cylinder head or the fixing frame.

9. The device according to claim 4, further comprising at least one positioning element which is arranged between the first bearing body and the second bearing body for positioning the first bearing body relative to the second bearing body.

10. The device according to claim 9, wherein the at least one positioning element arranged between the first bearing body and the second bearing body comprises a positioning dowel, an adapter sleeve surrounding the first fixing means or an adapter sleeve surrounding a second fixing means.

11. The device according to claim 4, further comprises:

at least one positioning element which is arranged between the first bearing body or the second bearing body on one side and the cylinder head or the fixing frame on another side, for positioning the first or second bearing body relative to the cylinder head or fixing frame; or the device comprises no positioning element for positioning the first or second bearing body relative to the cylinder head or the fixing frame.

12. The device according to claim 11, wherein the at least one positioning element arranged between the first or second bearing body and the cylinder head or fixing frame comprises a positioning dowel or an adapter sleeve which surrounds the first fixing means.

13. The device according to claim 1, wherein:

the first bearing body has a receiver for a rocker arm shaft which is arranged on a side of the first bearing body opposite the cylinder head or fixing frame; or a longitudinal channel of the rocker arm shaft for lubricating fluid is fluidically connected to the receiver for the camshaft of the first bearing body.

14. The device according to claim 13, wherein:

the longitudinal channel of the rocker arm shaft for lubricating fluid is fluidically connected to the receiver for the camshaft of the first bearing body via a branch channel of the first bearing body and a branch channel of the rocker arm shaft.

15. The device according to claim 1, wherein the fixing frame or the cylinder head has a hole with a thread for force-fit and form-fit fixing of the first bearing body to the fixing frame or cylinder head by means of the first fixing means.

16. The device according to claim 15, wherein:

the hole is a blind hole or a passage hole.

17. The device according to claim 1, wherein:

the first bearing body is configured asymmetrically relative to a vertical plane through a central longitudinal axis of the receiver for the camshaft; or the first fixing means generates a tilting moment to support the first bearing body on a contact face of the cylinder head or the fixing frame.

18. The device according to claim 1, wherein the first fixing means is a fixing screw, and wherein the screw force of the fixing screw and a unilateral material region next to the fixing screw generate the tilting moment on the contact face of the cylinder head or the fixing frame, which holds the first side region of the first bearing body securely on the cylinder head or the fixing frame.

19. The device according to claim 1, further comprising:

a rocker arm shaft for rotatable mounting of a rocker arm, wherein the first fixing means additionally fixes the rocker arm shaft to the cylinder head or the fixing frame, and wherein the camshaft is pressed down during operation by a cam follower of the rocker arm and the own weight of the camshaft also acts downward so that camshaft has no tendency to lift, together with the second side region of the bearing body, from the cylinder head or the fixing frame.

20. The device according to claim 1, further comprising:

a positioning element for positioning the first bearing body relative to the cylinder head or the fixing frame, wherein the positioning element is configured as a positioning dowel arranged at a distance from the first fixing means and held by form fit in a recess of the first bearing body and a recess of the cylinder head or the fixing frame.

21. The device according to claim 20, wherein the recess of the first bearing body is arranged in the second side region.

22. A motor vehicle comprising:

a device for rotable mounting of a camshaft of an internal combustion engine, the device including:

a first bearing body composed of a first side region and a second side region, wherein the first bearing body comprises a receiver for rotatable mounting of the camshaft arranged in the second side region;

a cylinder head or a fixing frame for fixing the first bearing body, wherein the first side region and the second side region are directly in contact with a contact face of the cylinder head or the fixing frame;

a first fixing means being the sole fixing means which fixes the first bearing body to the cylinder head or the fixing frame, wherein:

a) the first fixing means is partially arranged in the first side region and generates a tilting moment to support the first side region of the first bearing body on the contact face of the cylinder head or the fixing frame, and b) an own weight of the camshaft acts downward to support the second side region of the first bearing body on the contact face of the cylinder head or the fixing frame frame, and c) the second side region and the contact face contact each other in a region extending from the first fixing means only to a point directly below the receiver for mounting the camshaft.

23. The motor vehicle of claim 22, wherein the motor vehicle is a utility vehicle.

* * * * *